United States Patent [19]
Lake et al.

[11] 3,888,008
[45] June 10, 1975

[54] HANDPIECE AND CHUCK WRENCH THEREFOR

[75] Inventors: Charles C. Lake, Park Ridge; Boubene M. Jaremus, Barrington, both of Ill.

[73] Assignee: American Hospital Supply Corporation, Evanston, Ill.

[22] Filed: Jan. 24, 1973

[21] Appl. No.: 326,569

[52] U.S. Cl. .................................................. 32/27
[51] Int. Cl. ............................................. A61c 1/10
[58] Field of Search ...................... 32/27, 26, 40 R

[56] References Cited
UNITED STATES PATENTS
3,325,899   6/1967   Staunt .................................. 32/27

*Primary Examiner*—Robert Peshock
*Attorney, Agent, or Firm*—Dawson, Tilton, Fallon & Lungmus

[57] ABSTRACT

A dental handpiece and wrench wherein the handpiece is provided with a threaded collet chuck which may be adjusted by the wrench for gripping or releasing a dental bur. If desired, the chuck may be completely unthreaded and extracted from the lower end of the handpiece housing. The wrench is manipulated from the upper end of the housing and operates to rotate the internally-threaded rotor of the handpiece while at the same time restraining rotational movement of the chuck.

46 Claims, 14 Drawing Figures

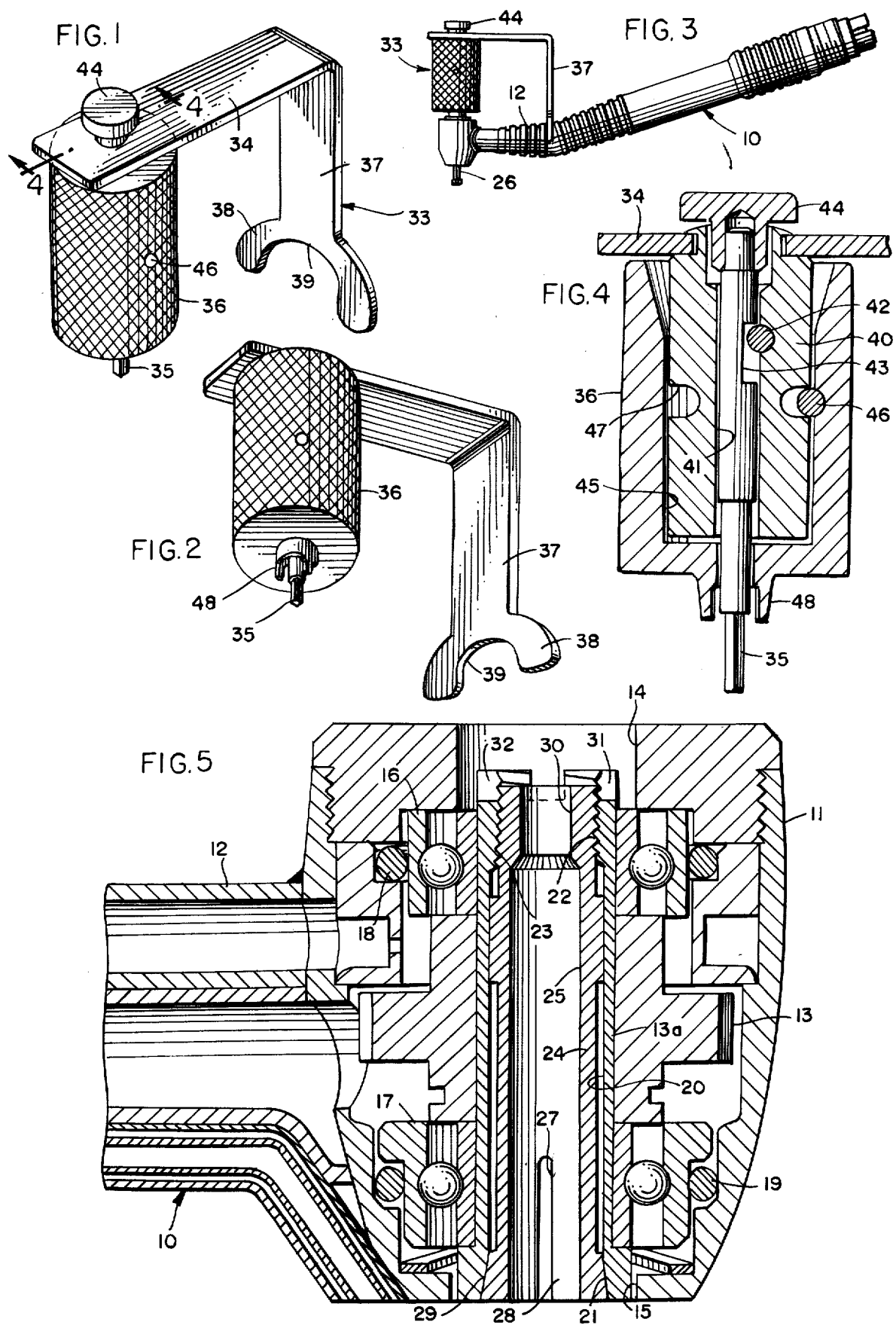

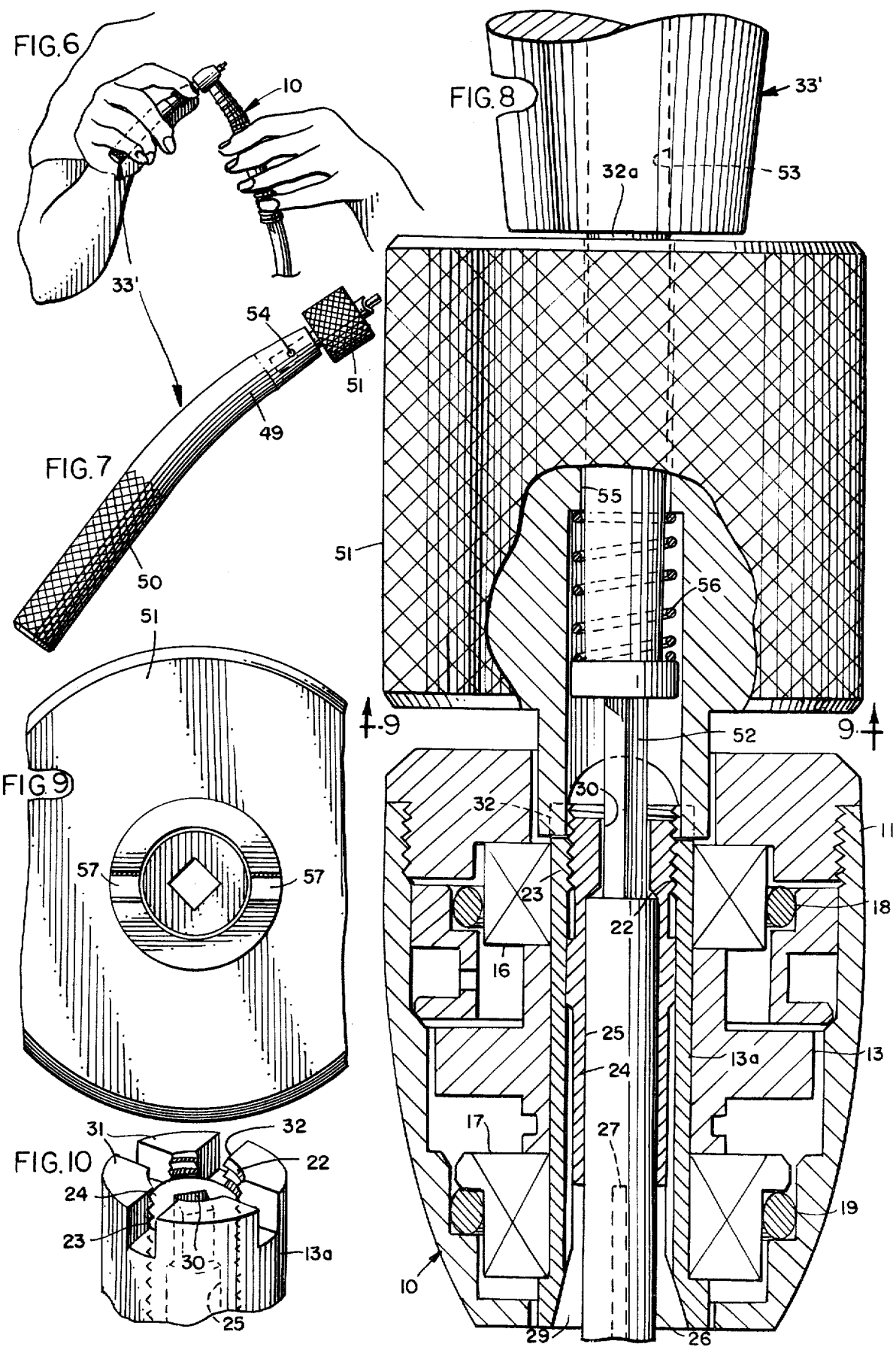

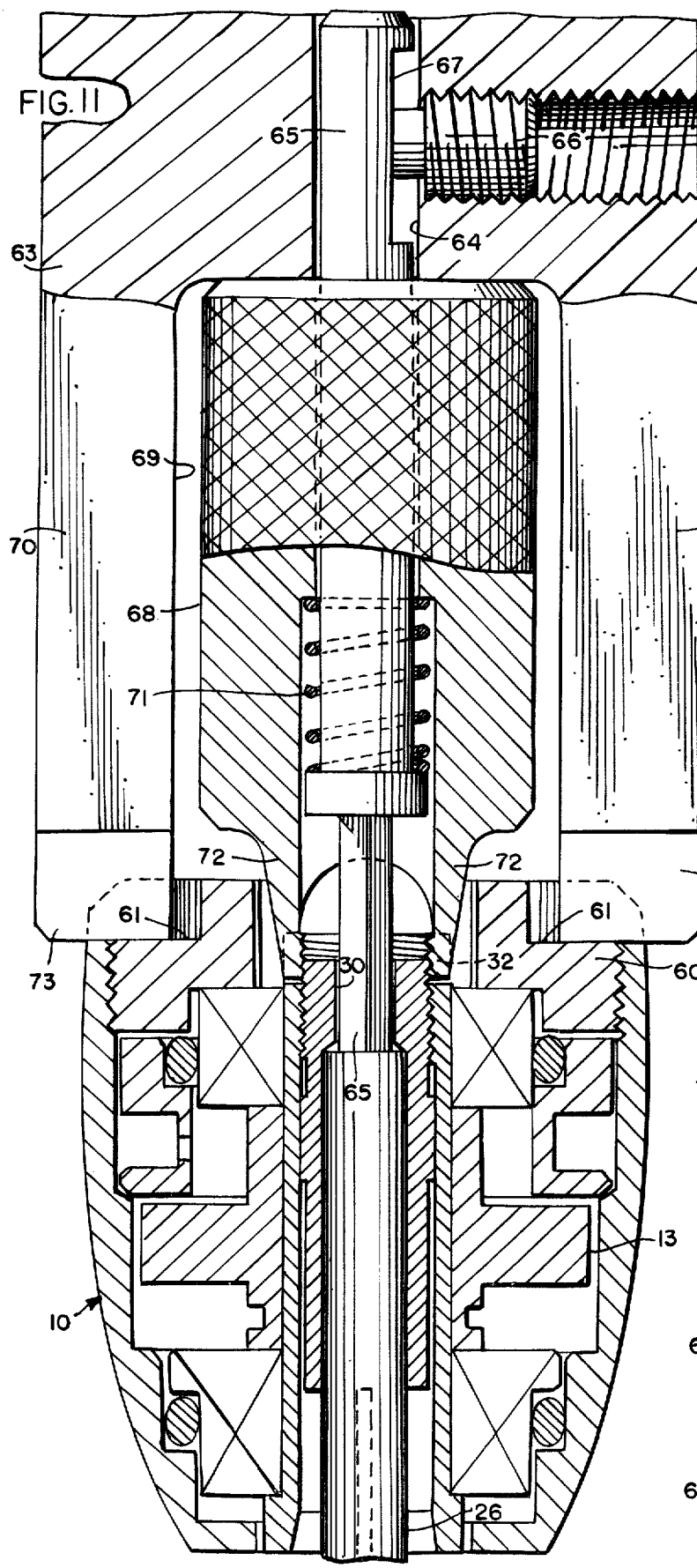

HANDPIECE AND CHUCK WRENCH THEREFOR

BACKGROUND

In the past, dental handpieces with threaded collet chucks have generally been adjustable by rotating the collet within the threaded bur tube of the rotor. In those cases where the rotor is air driven, or (regardless of how it derives its power) is not self-locking in an inoperative state, some means must be provided to hold the rotor stationary as the chuck is threaded or unthreaded. In Turchi et al. U.S. Pat. No. 3,120,706, the rotor is restrained by a latch projecting into the turbine chamber and engaging the turbine blades; in Staunt U.S. Pat. No. 3,325,899 the turbine is held immovable by wrench pins which pass through the housing and are received within openings in the rotor; and in Lieb et al. U.S. Pat. No. 3,499,223 the rotor is locked by a key slidably mounted upon the handpiece, the key engaging a hex nut disposed at the top of the rotor. In other commercial constructions, wrenches have been provided which span the housing of the handpiece and which engage a nut provided at the bottom or bur end of the rotor, thereby preventing rotor rotation as the chuck is loosened or tightened by a tool inserted through the housing's opposite (upper) end.

All of such constructions have some shortcomings or disadvantages. Thus, Pats. Nos. 3,120,706, 3,499,223 and 3,325,899 all disclose chucks having spring fingers or jaws of diminishing taper. Tightening of such a chuck is achieved by camming the tapered ends of the jaws inwardly as the chuck is threaded downwardly. Because of their diminishing taper, such jaws are relatively easily deformed or damaged should excessive tightening forces be applied and, in addition, their cooperating parts may be difficult to machine. Furthermore, such a chuck cannot easily be extracted for cleaning, repair, or replacement unless an undesirably large opening is formed in the rear or upper end of the handpiece housing. An even more serious problem is that such a chuck tends to be self-loosening in operation; that is, the counter-torque imposed on the bur by the resistance of the workpiece tends to cause the chuck to unthread in an upward direction, thereby releasing the bur downwardly or, in some cases, permitting the chuck and bur to be discharged from the top opening of the housing.

From the standpoint of strength, durability, and ease of manufacture, chucks having jaws which taper or flare outwardly at their lower ends have certain advantages. Unfortunately, they also have even more severe disadvantages, since, if their chucks are to be rotated in a conventional direction for tightening purposes, then they are inherently self-loosening in operation and, because release of the bur and chuck from the lower end of the housing poses an even greater potential danger for a patient, especially because such handpieces often attain rotational speeds of 300,000 rpm or more, such constructions are to be regarded as generally unacceptable. While the problem might be reduced by eliminating the threaded connection between the chuck and rotor and substituting a spring-loaded chuck as in Pat. No. 3,074,167, a somewhat similar problem is nevertheless presented and might even be magnified or compounded by the existence of additional parts capable of self-loosening and release.

Solutions to the dilemma have been proposed but are generally unacceptable. Threading might be reversed so that the parts become self-tightening in operation; however, conventional directions of rotation for loosening and tightening such a chuck would also be reversed and users would have to be re-educated in the use of wrenches which operate directly opposite from standard wrenches with which dentists are already familiar. Since dentists commonly use a number of handpieces, considerable confusion and serious damage to instruments might result should a dentist inadvertently manipulate the wrench in the wrong direction for any given instrument. Somewhat similar problems would arise if standard wrench operation were retained but the rotors were designed to rotate (during operation) in the opposite direction. In that case, standard burs, designed for use with conventional handpieces in which bur rotation is in a clockwise direction (when viewed from above) could not be used in the reverse-direction handpieces. Errors by users, and dangers resulting therefrom, would be inevitable.

SUMMARY

The present invention is concerned with a construction which overcomes all of the aforementioned defects and disadvantages of prior units and, at the same time, achieves all of the above-described advantages. Specifically, the invention concerns a handpiece and wrench combination in which the handpiece is provided with a collet chuck which has outwardly flared or tapered jaws, is readily removable from the lower end of the housing for field replacement, is self-tightening in operation, and is readily adjustable by a wrench which engages the parts (i.e., rotor and chuck) only from the upper end of the housing. Both the wrench and the associated parts of the handpieces are relatively simple and durable in construction, and standard directions of rotation are retained for both wrench operation and rotor rotation.

The threaded chuck, with its outwardly flared jaws, is tightened by being drawn upwardly and is loosened by being lowered. The chuck and rotor are operatively interconnected by right-hand threads; that is, when viewed from above, relative counterclockwise rotation of the chuck causes the chuck to move upwardly while relative clockwise rotation directs it downwardly. Since the counter-torque imposed by the resistance of a workpiece urges the chuck in a counterclockwise direction (in opposition to the clockwise direction of the driving force), the chuck is self-tightening in operation. Unlike prior constructions, the chuck is provided with means at its upper end, accessible through the top opening of the housing, for holding the chuck against rotation when adjustment is desired. In addition, the rotor is provided with means at its upper end, also accessible through the top opening of the housing, for engaging and turning the rotor while the chuck is held in place. A wrench cooperates with such means and is provided with a rotary member which may be easily gripped and turned between the fingers for rotating the rotor while chuck rotation is restrained. Thus, by turning the rotor about the non-rotating chuck, the chuck is shifted axially to grip or release a dental bur. If rotation in a releasing direction is continued, then the chuck ultimately disengages from the rotor and may be extracted or withdrawn from the lower end of the housing. Since it is the rotor and not the chuck which is rotated during such an adjustment operation, the conventional directions of rotation are retained. In other words, manipulation of the rotary member of the wrench in a right-hand direction (when viewed from above the housing) causes tightening of the chuck, and counterclockwise rotation causes loosening and eventual release of the chuck.

In certain embodiments of the invention, the chuck is restrained against rotation during adjustment by bracing the wrench on the handpiece itself. In another embodiment, the wrench is provided with a handle which may be easily gripped by the user to prevent chuck rotation.

Other advantages and objects of the invention will become apparent as the specification proceeds.

DRAWINGS

FIGS. 1–5 illusrates one embodiment of the invention, in which FIG. 1 is a perspective view of the wrench;

FIG. 2 is another perspective view illustrating the underside of the wrench;

FIG. 3 is a side elevational view illustrating the wrench and handpiece is coupled condition;

FIG. 4 is a vertical sectional view of the wrench taken along line 4—4 of FIG. 1;

FIG. 5 is a vertical sectional view of the handpiece (on a larger scale than FIG. 4) illustrating details of construction thereof;

FIGS. 6–10 illustrate a second embodiment of the invention, FIG. 6 illustrating such embodiment as it is being manipulated by a user;

FIG. 7 is a plan view of the wrench;

FIG. 8 is an enlarged vertical plan view, shown partly in section, illustrating the wrench and handpiece in operative engagement;

FIG. 9 is a fragmentary bottom view of the wrench taken along line 9—9 of FIG. 8;

FIG. 10 is an enlarged fragmentary perspective view showing details of the upper ends of the chuck and rotor;

FIGS. 11–14 illustrate a third embodiment of the invention, in which FIG. 11 is an enlarged vertical plan view, shown partly in section, illustrating the wrench and handpiece in operative condition for adjustment;

FIG. 12 is a perspective view of the wrench;

FIG. 13 is another perspective view of the wrench;

FIG. 14 is a perspective view of the top or closure member of the handpiece housing.

DESCRIPTION

Referring to the embodiment illustrated in FIGS. 1 through 5, the numeral 10 generally designates a handpiece of the air-driven contra angle type. The handpiece has an outer housing 11 which includes a neck portion 12 (FIG. 5). Within the chamber of the housing is a rotor 13 adapted to be driven in a clockwise direction (when viewed from the upper end of the housing) by air supplied through the handle and neck 12. Upper and lower openings 14 and 15 are formed in the housing and are axially aligned with the rotor, the latter being supported by rotation by upper and lower bearing assemblies 16 and 17. In the particular form illustrated, resilient rings 18 and 19 are interposed between the bearings and the walls of the housing to reduce the noise level of handpiece operation.

Rotor 13 includes a bur tube 13a which extends between openings 14 and 15 and which has a central bore 20 axially aligned with those openings. It will be observed that the bore is provided with outwardly flared frustoconical surfaces 21 at its lower end. At its upper end, the bur tube has internal threads 22. Such threads mate with the external threads 23 at the upper end of a collet chuck 24. The chuck extends substantially the full length of the rotor bur tube 13a and is provided with a bore 25 adapted to receive the shank of a standard dental bur 26 (FIG. 3). A plurality of longitudinal slots 27 extend upwardly from the lower end of the chuck to define a plurality of circumferentially-spaced spring jaws 28 for gripping the shank of the bur as the chuck is shifted upwardly. It will be noted that the lower end of the chuck is externally enlarged at 29, preferably in a frusto-conical fashion to provide surfaces which mate with the outwardly flared surfaces 21 of the bur tube. Consequently, as the chuck moves upwardly relative to the bur tube of the rotor, jaws 28 are cammed inwardly into forceful engagement with the shank of bur 26 and, conversely, when the chuck is shifted downwardly, the clamping or gripping force of the jaws is released.

Threads 22 and 23 are standard right-hand threads, with the result that any forces transmitted to the chuck which tend to resist or restrain clockwise rotation of the rotor during normal operation will tend to screw the chuck upwardly, thereby increasing the closing force imposed on jaws 28. The chuck is therefore self-locking during handpiece operation since the counter-torque created by contact between the bur and a workpiece only causes the chuck to grip the bur more tightly. Such self-locking operation is achieved while, at the same time, providing a chuck with jaws of increasing (rather than diminishing) taper, and one which may be extracted from the lower end of the housing whenever cleaning, replacement, or repair of the chuck is desired.

Means are provided at the upper end of the chuck for holding the same against rotation within the handpiece housing during collet adjustment. In the illustration given, such means takes the form of a plurality of angular surfaces defining a non-circular bore 30 which extends downwardly from the upper end of the chuck and which communicates, and is coaxial with, cylindrical bore 25. In the embodiment of FIGS. 11–5, bore 30 is rectangular (square) in cross sectional configuration; however, other non-circular configurations, such as hexagonal, might conceivably be used.

Means are also provided at the upper end of the rotor to permit gripping the turning of the rotor about its axis at the same time that the chuck is restrained against rotational movement. Such means comprises a plurality of circumferentially-spaced projections 31 which define therebetween a plurality of external upwardly-facing recesses 32 at the bur tube's upper end. Theoretically, only a single recess would be sufficient for the purpose of gaining purchase on the bur tube's upper end; however, for practical purposes at least two such recesses, diametrically opposed, are desired and an even greater number (four in FIG. 10) is preferred.

Wrench 33 includes a body portion 34, a chuck locking bar 35, and a rotary member 36. In the embodiment of FIGS. 1–5, the body 34 of the wrench has a depending extension 37 which is bifurcated at its lower end to provide a pair of arms 38 defining a recess 39 therebetween. When the parts are assembled for collet adjustment, arms 38 straddle neck 12 as indicated in FIG. 3, the neck being received in recess 39, to brace the body against movement about the axis of bar 35.

The wrench bar 35 is mounted upon body 34 for limited axis movement but is securely restrained against independent rotational movement. In FIG. 4, it will be seen that a cylindrical core member 40 is rigidly secured to the horizontal upper portion of wrench body 34. The elongated bar 35 extends through a bore 41 in the core and a transverse pin 42 passes through the core, projecting into bore 41 and into a longitudinally-elongated recess 43 in bar 35. The pin thereby locks the bar against rotational movement relative to the wrench body but permits axial movement of the bar within the longitudional limits of recess 43. At its upper end, the bar may be provided with a suitable knob or enlargement 44.

Rotary member 36 is coaxial with bar 35 and is of generally cylindrical shape. Its outer surface is knurled or is otherwise treated to make it slip-resistant. As shown in FIG. 4, the rotary member is provided with an upwardly-opening cylindrical cavity 45 which loosely receives core 40. A pin 46 extends transversely through the rotary member, passing tangentially through an annular groove 47 in the core. The rotary member is therefore freely rotatable about the core (and about bar 35) but is restrained against axial movement with respect to the wrench body.

At its lower end, the rotary member is provided with one or more depending lugs 48. A pair of such lugs have been found particularly effective and, as shown in the drawings, such lugs are preferably diametrically disposed. Such lugs are positioned and proportioned to be received in the recesses 32 of the rotor when the wrench and handpiece are fitted together as depicted in FIG. 3. The lower end portion 35a of wrench bar 35 projects downwardly a substantial distance below the ends of lugs 48 and is dimensioned to be slidably received in bore 30 of chuck 24. Such lower portion 35a is non-circular in cross sectional configuration, the particular configuration being selected to meet with the non-circular configuration of bore 30. Thus, when the parts are assembled as illustrated (FIG. 3), wrench bar portion 35a fits within the bore 30 to lock the chuck and wrengh body 34 against independent rotation, and lugs 48 fit within rotor recesses 31 to secure the rotor 13 and rotary chuck member 36 against independent movement.

With the parts in assembled condition, adjustment of the chuck is achieved by simply turning rotary member 36 in one direction or the other to loosen or tighten the jaws of the chuck. An important aspect of the invention lies in the fact that during such adjustment the chuck itself does not rotate, the rotary force instead being imparted to rotor 13. Since the chuck and rotor bur tube are connected by right-hand threads, loosening of the chuck is achieved by counterclockwise rotation of the rotary member 36 and tightening of the chuck occurs when the rotary member is turned in a clockwise direction (when viewed from above). Thus, the directions of wrench rotation for purposes of chuck adjustment (or removal) are entirely consistent with standard practice in the tightening and loosening of threaded members and no special instructions concerning direction of rotation are necessary for proper use of the wrench.

As the chuck is loosened it moves axially downwardly within the threaded bur tube but, since the bar 35 is mounted for limited axial movement, the chuck and bar remain in locking engagement. When the gripping force on the bur has been sufficiently relieved, the bur may be expelled, or at least urged downwardly a limited extent from the chuck, by simply depressing knob 44 of the wrench.

In the embodiment illustrated in FIGS. 6 through 10, the handpiece 10 is substantially identical to the handpiece already described and like numbers are used to designate the corresponding parts. FIG. 10 illustrates in enlarged perspective view the interrelationship between the upper end of bur tube 13a and chuck 24. That interrelationship is the same in all of the various embodiments of the invention.

The principal difference lies in the fact that the wrench 33' of FIGS. 6–9 is not braced against the housing of the handpiece during adjustment of the chuck. Instead, the body 49 of the wrench is provided with a handle portion 50 which may be easily gripped between the fingers and the palm and thus held in stationary condition as rotary member 51 is turned between the fingers (FIG. 6).

As in the prior embodiment, wrench bar 52 is non-circular in cross sectional configuration and is secured to the wrench body so that it is locked against independent rotation relative thereto. The proximal portion of the wrench body is provided with a bore 53 which slidably receives the upper end 52a of bar 52, the upper end portion of the bar being recessed (in the same manner indicated by 43 in FIG. 4) and locked against limited axial movement by pin 54 (in the same manner that bar 35 is restrained by pin 42). The rotary member 51 has an axial bore 55 which rotatably and slidably receives bar 52 and a spring 56 simultaneously urges the bar downwardly and the rotary member upwardly in the manner shown in FIG. 8. The bar as illustrated in FIG. 8 is partially extended; it is capable of further extension downwardly as the bur 26 is released by the jaws of chuck 24 and is extracted from bore 25. The rotary member 51 is generally cylindrical in shape, has a knurled slip-resistant outer surface, and is provided with a pair of depending lugs 57 diametrically disposed on opposite sides of the lower end portion of bar 52. The ends of the lugs are received in recesses 32 at the upper end of the rotor in the same manner described in connection with the first embodiment. Adjustment and release of the collet chuck is the same as previously described, the only difference being that the chuck is locked against rotation during such adjustment by holding the knurled distal portion 50 of the somewhat arcuate or banana-shaped body of the wrench between the fingers and the palm of the hand (FIG. 6).

In the embodiment of FIGS. 11–14, the handpiece is again the same as the handpieces already described except that the upper closure 60 of the handpiece is provided with a plurality of recesses or openings 61. The construction is most clearly illustrated in FIG. 14, where it will be observed that the recesses or openings are arranged in diametrically disposed pairs. The arrangement may be varied and a greater or smaller number of recesses may be provided; however, at least a pair of such recesses in diametrically opposed relation is preferred. In all other respects, the handpiece 10 illustrated in FIG. 11 is the same as the handpieces of the prior embodiments.

Wrench 62 includes a body 63 in the form of an inverted U-shaped plate having a vertical bore 64 extending through its intermediate portion. The upper end of wrench bar 65 is received within bore 64 for limited longitudinal movement. The longitudinal movement is limited, and relative rotational movement is prevented, by a retention screw 66 which projects into bore 64 and into recess 67 at the bar's upper end. Consequently, the bar is secured against rotational movement, but is permitted a limited amount of longitudinal movement relative to the wrench body, in essentially the same manner as described in connection with the prior embodiments.

The rotary member 68 is generally cylindrical in configuration and is disposed within the space 69 between the depending arms 70 of body 63. As in the prior embodiments, the rotary member is coaxial with bar 65. A spring 71 interposed between the bar and the rotary member urges the bar downwardly and at the same time directs the rotary member upwardly. At its lower end, the rotary member is provided with a pair of lugs 72 which are receivable in recesses 32 of the bur tube in the same manner described previously.

The depending arms 70 of the wrench body are provided with tapered blade portions 73 at their lower ends which are disposed on opposite sides of bar 65 and are receivable in recesses 61 of handpiece 10. As a result, when the parts are assembled as illustrated in FIG. 11, the body of the wrench is anchored against rotational movement relative to the handpiece housing and, since bar 65 is fixed against rotation with respect to the wrench body, and since the lower non-circular end of the bar is received within bore 30 of the chuck, the chuck is effectively held against rotation with respect to the handpiece casing. By rotating member 68 between the fingers, a user may therefore turn rotor 13 about its axis to thread the chuck upwardly or downwardly for purposes of gripping or releasing a dental bur.

In all of the embodiments described, the collet chucks are self-tightening in operation, in response to counter-torque imposed by a workpiece, and are nevertheless loosened and tightened at will by turning the rotary member of each wrench in conventional directions (counterclockwise for loosening and clockwise for tightening. In each form, manipulation of the wrench turns the rotor while the chuck is held stationary. While in the preferred forms of the invention, the chucks have outwardly flared or tapered jaws and are removable from the lower ends of the handpiece housings, somewhat similar results might be achieved by using a chuck with jaws of diminishing taper which, although less desirable for reasons already described, might then be extracted from the upper end of the housing if left-hand threads were used to join the chuck and rotor. Wrench operation would be essentially as described, with the rotary member of the wrench being operative upon rotation in a clockwise direction to turn only the rotor and thereby tighten the chuck, and upon rotation in a counterclockwise direction to loosen the chuck. In all of such constructions, the cooperating threads of the chuck and rotor have a lead angle which directs the chuck axially for tightening purposes when the chuck is turned counterclockwise relative to the rotor.

While in the foregoing we have disclosed several embodiments of the invention in considerable detail for purposes of illustrated, it will be understood by those skilled in the art that many of such details may be varied without departing from the spirit and scope of the invention.

We claim:

1. A dental handpiece combination comprising a rotor housing having a chamber and having upper and lower openings coaxial therewith, a rotor within said chamber having a bore aligned with said openings and being adapted to be driven in a clockwise direction when viewed from above during normal handpiece operation, said bore having outwardly flared surfaces at its lower end, a collet chuck received within said bore and having a plurality of spring jaws at its lower end for releasably holding a dental bur, said jaws being externally enlarged at their lower ends to provide bearing surfaces engageable with the flared surfaces of said bore, said chuck and said rotor being threadedly connected within said bore by right-hand threads which direct said chuck upwardly to force said jaws into camming engagement with said flared surfaces when said chuck is urged in a counterclockwise direction relative to said rotor, means provided at the upper end of said chuck and accessible through the upper opening of said housing for holding said chuck against rotation within said housing, and means provided at the upper end of said rotor and accessible through said upper opening for engaging said rotor and turning the same about its axis while said chuck is held against rotation within said housing, whereby, said chuck is self-tightening within said rotor in response to resistance exerted against a bur held by said chuck in normal operation of said handpiece and may be loosened and extracted from the lower end of said rotor by holding the upper end of said chuck against rotation relative to said housing and then turning the upper end of said rotor in a counterclockwise direction when viewed from above.

2. The structure of claim 1 in which said first-mentioned means comprises a non-circular bore defining angular surfaces of engagement accessible through said upper opening for engaging said chuck and holding the same against rotation as said rotor is turned.

3. The structure of claim 2 in which said bore is rectangular in cross section for slidably receiving a rectangular wrench bar.

4. The structure of claim 1 in which said second-mentioned means comprises a plurality of upstanding projections spaced circumferentially about the upper end of said rotor and defining a plurality of upwardly-opening recesses accessible through said upper opening of said housing.

5. The structure of claim 1 in which said first-mentioned means comprises angular surfaces of engagement provided by said chuck and exposed through said upper opening, and said second-mentioned means comprises upstanding projections spaced about the upper end of said rotor and defining a plurality of recesses accessible through said upper opening, and a wrench removably disposed above said housing and having a depending chuck-locking bar engaging said angular surfaces for locking said chuck against rotation relative to said wrench, said wrench also including a rotary member extending about said bar and having depending lugs receivable in said recesses for releasably coupling said rotor and said rotary member for simultaneous rotation, whereby manual rotation of said rotary member in either direction causes threading and unthreading of said chuck within said rotor to close and open said jaws for gripping and releasing a dental bur.

6. The structure of claim 5 in which said bar is axially movable within said rotary member.

7. The structure of claim 5 in which said bar extends substantially below said lugs.

8. The structure of claim 5 in which said angular surfaces of engagement define a non-circular bore extending downwardly from the upper end of said chuck, said bar being non-circular in cross section for mating engagement with the surfaces of said non-circular bore.

9. The structure of claim 5 in which said rotary member is generally cylindrical in configuration and is provided with a slip-resistant outer surface for facilitating manual rotation.

10. The structure of claim 9 in which said slip-resistant outer surface is knurled.

11. The structure of claim 5 in which said wrench includes a body, said bar being mounted upon said body and being fixed against relative rotation thereon, said rotary member being mounted upon said body for rotation with respect thereto, and said body being provided with attachment means releasably engageable with said housing to interconnect said housing and bar and thereby lock said chuck against rotation within said housing.

12. The structure of claim 11 in which said housing includes a neck portion, said attachment means of said wrench body comprising a body extension having a recess receiving said neck portion for locking engagement therewith.

13. The structure of claim 11 in which said housing is provided with at least one external notch, said attachment means including a finger spaced laterally from the axis of said bar and removably received in said notch for locking engagement therewith.

14. The structure of claim 5 in which said wrench includes a body, said bar being mounted upon said body and being fixed against relative rotation thereon, said rotary member being mounted upon said body for rotation with respect thereto, said body including a handle portion adapted to be held in the hand for constraining said chuck against rotation as said rotary member is turned.

15. A detanl handpiece combination comprising a rotor housing having a chamber and having upper and lower openings coaxial therewith, a rotor within said chamber having aa bore aligned with said openings and being adapted to be driven in a clockwise direction with viewed from above during normal handpiece operation, said bore having outwardly flared surfaces at its lower end, a collet chuck received within said bore and having a plurality of spring jaws at its lower end for releasably holding a dental bur, said jaws being externally enlarged at their lower ends to provide bearing surfaces engagable with the flared surfaces of said bore, said chuck and said rotor being threadedly connected within said bore by right-hand threads which direct said chuck upwardly to force said jaws into camming engagement with said flared surfaces when said chuck is urged in a counterclockwise direction relative to said rotor, means provided at the upper end of said chuck and accessible through the upper opening of said housing for holding said chuck against rotation within said housing, and means provided at the upper end of said rotor and accessible through said upper opening for engaging said rotor and turning the same about its axis while said chuck is held against rotation within said housing, whereby, said chuck is self-tightening within said rotor in response to resistance exerted against a bur held by said chuck in normal operation of said handpiece and may be loosened and extracted from the lower end of said rotor by holding the upper end of said chuck against rotation relative to said housing and then turning the upper end of said rotor in a counterclockwise direction when viewed from above, said first-mentioned means comprising angular surfaces of engagement provided by said chuck and exposed through said upper opening, said second-mentioned means comprising upstanding projections spaced about the upper end of said rotor and defining a plurality of recesses accessible through said upper opening, and a wrench removably disposed above said housing and having a depending chuck-locking bar engaging said angular surfaces for locking said chuck against rotation relative to said wrench, said wrench also including a rotary member extending about said bar and having depending lugs receivable in said recesses for releasably coupling said rotor and said rotary member for simultaneous rotation, whereby manual rotation of said rotary member in either direction causes threading and unthreading of said chuck within said rotor to close and open said jaws for gripping and releasing a dental bur, said wrench including a body, said bar being mounted upon said body and being fixed against relative rotation thereon, said rotary member being mounted upon said body for rotation with respect thereto, said body including a handle portion adapted to be held in the hand for constraining said chuck against rotation as said rotary member is turned, said handle being provided with a portion which projects axially away from said rotary member and bar.

16. The structure of claim 15 in which said handle is also provided with a distal portion merging with said first-mentioned portion but disposed at an obtuse angle relative thereto.

17. The structure of claim 5 in which said wrench includes a body, said bar being mounted upon said body for limited axial movement, and being fixed against independent rotation, relative thereto; and said rotary member being mounted upon said body for rotation with respect thereto.

18. A dental handpiece combination comprising a rotor housing having a chamber and having upper and lower openings coaxial therewith, a rotor within said chamber having a bore aligned with said openings and being adapted to be driven in a clockwise direction when viewed from above during normal handpiece operation, said bore having outwardly flared surfaces at its lower end, a collet chuck received within said bore and having a plurality of spring jaws at its lower end for releasably holding a dental bur, said jaws being externally enlarged at their lower ends to provide bearing surfaces engageable with the flared surfaces of said bore, said chuck and said rotor being threadedly connected within said bore by right-hand threads which direct said chuck upwardly to force said jaws into camming engagement with said flared surfaces when said chuck is urged in a counterclockwise direction relative to said rotor, means provided at the upper end of said chuck and accessible through the upper opening of said housing for holding said chuck against rotation within said housing, and means provided at the upper end of said rotor and accessible through said upper opening for engaging said rotor and turning the same about its axis while said chuck is held against rotation within said housing, whereby, said chuck is self-tightening within said rotor in response to resistance exerted against a bur held by said chuck in normal operation of said handpiece and may be loosened and extracted from the lower end of said rotor by holding the upper end of said chuck against rotation relative to said housing and then turning the upper end of said rotor in a counterclockwise direction when viewed from above, said first-mentioned means comprising angular surfaces of engagement provided by said chuck and exposed through said upper opening, said second-mentioned means comprising upstanding projections spaced about the upper end of said rotor and defining a plurality of recesses accessible through said upper opening, and a wrench removably disposed above said housing and having a depending chuck-locking bar engaging said angular surfaces for locking said chuck against rotation relative to said wrench, said wrench also including a rotary member extending about said bar and having depending lugs receivable in said recesses for releasably coupling said rotor and said rotary member for simultaneous rotation, whereby manual rotation of said rotary member in either direction causes threading and unthreading of said chuck within said rotor to close and open said jaws for gripping and releasing a dental bur, said wrench including a body, said bar being mounted upon said body for limited axial movement, and being fixed against independent rotation, relative thereto, and said rotary member being mounted upon said body for rotation with respect thereto, said wrench including spring means urging said bar downwardly relative to said body to maintain said bar in contact with said angular surfaces of engagement of said chuck as said chuck is unthreaded from said rotor.

19. The structure of claim 18 in which said bar in its lowered position extends downwardly a substantial distance beyond said lugs.

20. A wrench for use with a dental handpiece in which such handpiece is provided with a rotor housing having openings at its upper and lower ends and containing a rotor adapted to be driven in a clockwise direction when viewed from above, the rotor having a central bore threadedly receiving a collet chuck adapted to hold a dental bur and to be tightened or loosened when turned one way or the other relative to said rotor, said wrench comprising a wrench body, a bar projecting from said body and mounted thereon against independent relative rotation, said bar being engagable with the chuck of such a handpiece through the housing's open upper end to lock such chuck against rotation relative to the wrench body, and a rotary member mounted upon said body and concentric with said bar, said rotary member being provided with at least one lug engagable with the rotor of such a handpiece to turn the same about its axis while the chuck is locked against rotation, whereby, rotation of said rotary member in a clockwise direction when viewed from above would be operative to tighten the chuck of such a handpiece and rotation of said member in a counterclockwise direction would be operative to loosen the chuck.

21. The structure of claim 20 in which said bar is non-circular in cross sectional configuration.

22. The structure of claim 21 in which said bar is rectangular in cross sectional configuration.

23. The structure of claim 21 in which said rotary member is mounted for limited axial movement relative to said bar.

24. The structure of claim 20 in which said rotary member is generally cylindrical in shape and is provided with a slip-resistant outer surface.

25. The structure of claim 20 in which said rotary member is provided with a plurality of depending lugs spaced alongside said bar, said lugs being adapted to be received within recesses provided at the upper end of a handpiece rotor.

26. The structure of claim 20 in which said bar is mounted for limited axial movement relative to said body, said bar when positioned at the lower limit of its range of axial movement having its lower end projecting substantially below the lower end of said lug.

27. The structure of claim 26 in which spring means are provided for urging said bar downwardly relative to said body.

28. The structure of claim 20 in which said body is provided with a depending portion adapted to engage the housing of a dental handpiece for bracing said body and said bar during a chuck-adjusting operation.

29. The structure of claim 28 in which said depending portion is provided with a pair of arms adapted to straddle the neck of a dental handpiece.

30. The structure of claim 28 in which said depending portion comprises a finger adapted to be received in a recess at the upper end of a handpiece housing for bracing said body against rotation relative to said housing.

31. The structure of claim 20 in which said body includes an elongated handle portion projecting beyond the limits of said rotary member, said handle being adapted to be held within the hand of a user for restraining rotation of said body and bar as said rotary member is turned.

32. The structure of claim 31 in which said handle is provided with a distal portion disposed at an obtuse angle relative to the axis of said bar.

33. A dental handpiece combination comprising a rotor housing having a chamber and having upper and lower openings coaxial therewith, a rotor within said chamber having a bore aligned with said openings and being adapted to be driven in a clockwise direction when viewed from above during normal handpiece operation, a collet chuck received within said bore and having a plurality of spring jaws at its lower end for releasably holding a dental bur, said jaws being engagable with surfaces at the lower end of said bore for camming said jaws inwardly to grip a dental bur when said chuck is moved axially in one direction, said chuck and said rotor being threadedly connected within said bore for shifting said chuck axially so said chuck and rotor are turned relative to each other, the cooperating threads of said chuck and rotor having a lead angle for directing said chuck axially in said one direction as said chuck is turned counterclockwise relative to said rotor, means provided at the upper end of said chuck and accessible through the upper opening of said housing for holding said chuck against rotation within said housing, and means provided at the upper end of said rotor and accessible through said upper opening for engaging said rotor and turning the same about its axis while said chuck is held against rotation within said housing, whereby, said chuck is self-tightening within said rotor in response to resistance exerted against a bur held by said chuck in normal operation of said handpiece and may be loosened and extracted from said rotor by holding the upper end of said chuck against rotation relative to said housing and then turning the upper end of said rotor in a counterclockwise direction when viewed from above.

34. The structure of claim 33 in which said first-mentioned means comprises a non-circular bore defining angular surfaces of engagement accessible through said upper opening for engaging said chuck and holding the same against rotation as said rotor is turned.

35. The structure of claim 34 in which said bore is rectangular in cross section for slidably receiving a rectangular wrench bar.

36. The structure of claim 33 in which said second-mentioned means comprises a plurality of upstanding projections spaced circumferentially about the upper end of said rotor and defining a plurality of upwardly-opening recesses accessible through said upper opening of said housing, said upper opening having a radius larger than the distance between each said recess and the axis of said rotor.

37. The structure of claim 33 in which said first-mentioned means comprises angular surfaces of engagement provided by said chuck and exposed through said upper opening, and said second-mentioned means comprises upstanding projections spaced about the upper end of said rotor and defining a plurality of recesses through said upper opening, and a wrench removably disposed above said housing and having a depending chuck-locking bar engaging said angular surfaces for locking said chuck against rotation relative to said wrench, said wrench also including a rotary member extending about said bar and having depending lugs receivable in said recesses for releasably coupling said rotor and said rotary member for simultaneous rotation, said upper opening of said housing having a diameter larger than that of a circle circumscribing said lugs, whereby manual rotation of said rotary member in either direction causes threading and unthreading of said chuck within said rotor to close and open said jaws for gripping and releasing a dental bur.

38. The structure of claim 37 in which said bar is axially movable within said rotary member.

39. The structure of claim 37 in which said angular surfaces of engagement define a non-circular bore extending downwardly from the upper end of said chuck, said bar being non-circular in cross section for mating engagement with the surfaces of said non-circular bore.

40. The structure of claim 37 in which said wrench includes a body, said bar being mounted upon said body and being fixed against relative rotation thereon, said rotary member being mounted upon said body for rotation with respect thereto, and said body being provided with attachment means releasably engagable with said housing to interconnect said housing and bar and thereby lock said chuck against rotation within said housing.

41. The structure of claim 40 in which said housing includes a neck portion, said attachment means of said wrench body comprising a body extension having a recess receiving said neck portion for locking engagement therewith.

42. The structure of claim 40 in which said housing is provided with at least one external notch, said attachment means including a finger spaced laterally from the axis of said bar and removably received in said notch for locking engagement therewith.

43. The structure of claim 40 in which said body includes a handle portion adapted to be held in the hand for constraining said chuck against rotation as said rotary member is turned.

44. The structure of claim 43 in which said handle is provided with a portion which projects axially away from said rotary member and bar.

45. The structure of claim 44 in which said handle is also provided with a distal portion merging with said first-mentioned portion but disposed at an obtuse angle relative thereto.

46. The structure of claim 37 in which said wrench includes a body, said bar being mounted upon said body for limited axial movement, and being fixed against independent rotation, relative thereto; and said rotary member being mounted upon said body for rotation with respect thereto.

* * * * *